E. D. Barrett.
Cutting Screws.

Nº 60,822. Patented Jan. 1, 1867.

Witnesses

Inventor;
E. D. Barrett

United States Patent Office.

E. D. BARRETT, OF NEW HAVEN, CONNECTICUT, ASSIGNOR TO HIMSELF AND JULIUS B. SAVAGE.

Letters Patent No. 60,822, dated January 1, 1867.

IMPROVED DIES FOR CUTTING SCREWS.

The Schedule referred to in these Letters Patent and making part of the same.

TO ALL WHOM IT MAY CONCERN:

Be it known that I, E. D. BARRETT, of New Haven, in the county of New Haven, and State of Connecticut, have invented a new improvement in Adjusting Dies for Screw-Cutting Machines; and I do hereby declare the following, when taken in connection with the accompanying drawings, and the letters of reference marked thereon, to be a full, clear, and exact description of the same, and which said drawings constitute part of this specification, and represent, in—

Figure 1:
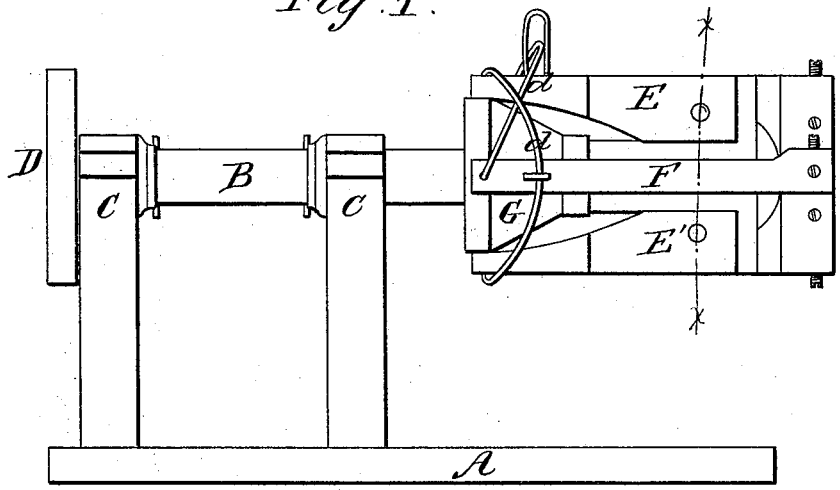
Figure 2:
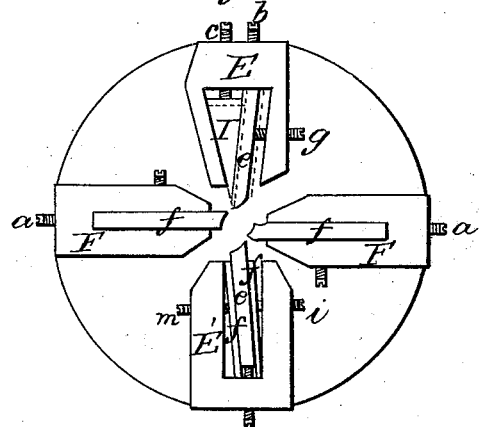

Figure 1, a side view of the cutter head of the machine, to which my improvement is especially adapted; and, in Figure 2, an end view of the cutter head, showing the cutters as heretofore set; also my improvement thereon.

My invention consists in the peculiar manner of adjusting the cutters, so as to commence their cut at different points on the screw, or at different inclination thereto; and to enable others to construct and use my improvement, I will proceed to describe the same as illustrated in the accompanying drawings.

A is the bed of the machine; B the mandrel supported in bearings, C, and caused to revolve by the application of power to the pulley D. On the outer end of the mandrel are hung four levers, E E' and F F, (more or less,) their extreme outer ends forming holders for the cutters $e$ and $f$, as seen in fig. 2. On the mandrel is placed an adjusting cone, G, which, being forced under the inner ends of the levers, as seen in fig. 1, closes the cutters upon the rod upon which the screw is to be cut, and when drawn out the springs $d$ open the cutters. This construction of the machine is common and well known. Heretofore the cutters have been fixed in the levers, as seen in F F, fig. 2. The only adjustment which could be given to the cutters was by means of the screws $a$; this would only adjust the diameter of the screw, so that when it was required to change the position of the cutting edge, the form of the cutter must be changed accordingly, a source of considerable inconvenience in the use of these machines. By my invention the cutter may be readily adjusted, as will be seen in fig. 2. The cutter end of the lever E is formed to receive the cutter $e$, and beside it a wedge, I. A set-screw, $b$, adjusts the cutter $e$ to the diameter of the screw required; the screw $c$ operating the wedge I to raise it up or down to adjust the cutting point of the cutter $e$; $g$, a set-screw to hold the cutter in its place when properly adjusted. Therefore the cutter $e$ and its wedge I, being set in the position denoted in black, if it is desirable to throw the cutting point back, release the set-screw $g$, force down the wedge I, as denoted in red, which will force the cutter back, as also denoted in red, or a reverse operation will bring the cutting point farther forward; thus the cutter may be adjusted with the greatest ease without changing its form or moving it from the machine. In the lever E' I show a similar adjustment of the cutter $e$. The cutter is placed between two plates, $f$ and $f$, and upon one side a set-screw, $i$, and upon the other a similar set-screw, $m$, moves the cutter to the right or left, as may be required to adjust the cutting position of the cutter $e$. The upper end of the cutter is retained in the position shown in the drawing, so that the adjustment of the screws $i$ and $m$ operate only upon the edge of the cutter. The cutter is adjusted to different diameters by the set-screw $b$, in like manner as before described.

I have represented my improvement as applied to the one class of screw-cutting machines described, yet I do not wish to be understood as limiting myself to this one class, as the same adjustment may be arranged in the cutter holders of all screw-cutting machines.

Having, therefore, thus fully described my invention, what I claim as new and useful, and desire to secure by Letters Patent, is—

The combination of the lever E, the wedge I, cutter $e$, and set-screws $g$ and $c$, so as to operate substantially in the manner herein set forth.

E. D. BARRETT.

Witnesses:
JOHN E. EARLE,
ALTSIE J. TIBBITS.